Jan. 26, 1932. A. B. F. PRUDHOMME 1,842,880
HEADLIGHT FOR MOTOR CARS
Filed May 21, 1928
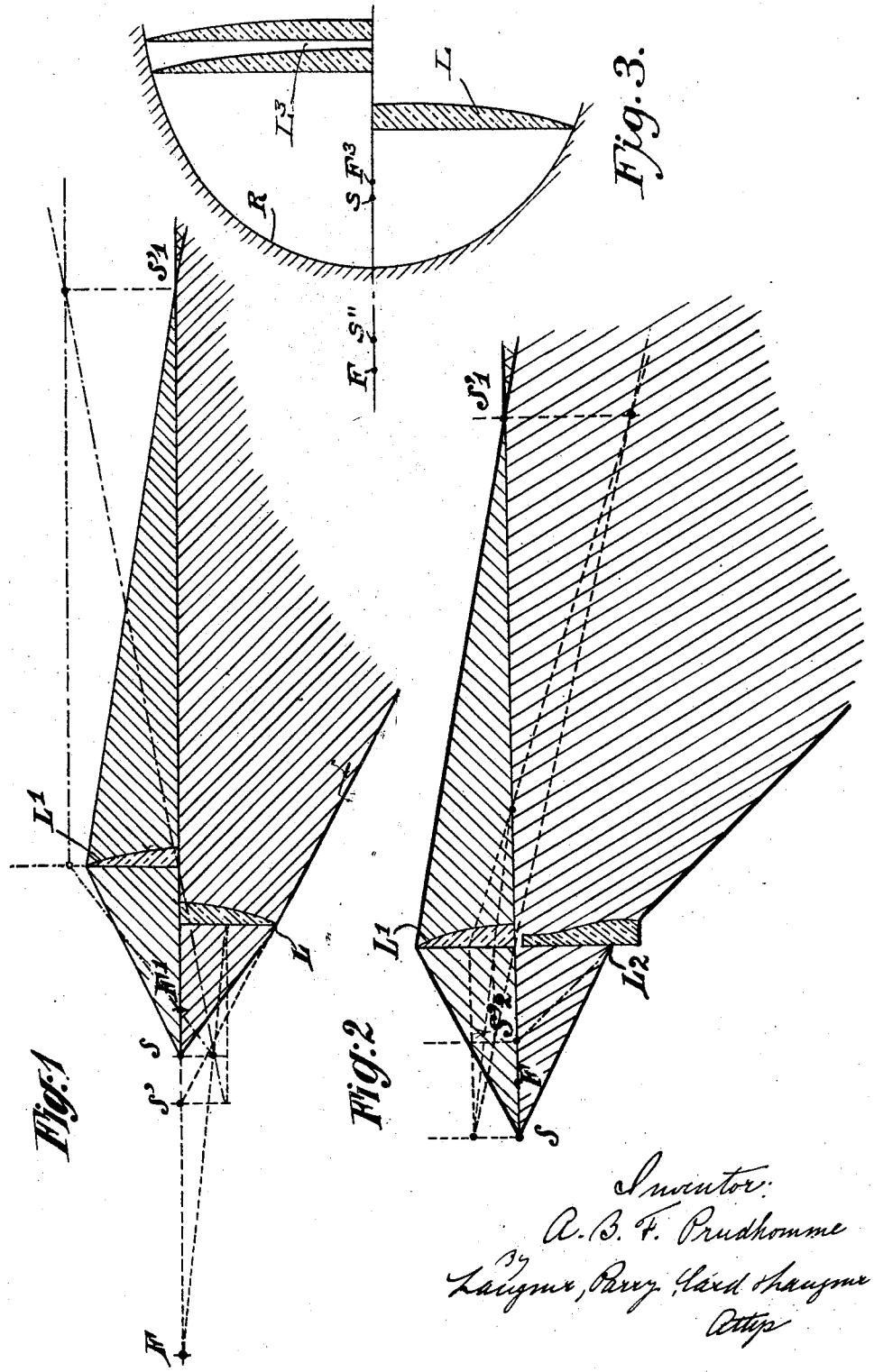

Patented Jan. 26, 1932

1,842,880

UNITED STATES PATENT OFFICE

AUGUSTE BENOIT FELIX PRUDHOMME, OF BEAULIEU-SUR-MER, FRANCE

HEADLIGHT FOR MOTOR CARS

Application filed May 21, 1928, Serial No. 279,474, and in France March 22, 1928.

The present invention relates to a headlight for motor vehicles which is adapted to produce a divergent and downwardly directed beam whereby the road will be better lighted and the motor car occupants or pedestrians coming in the other direction will not be blinded.

For this purpose, the headlight comprises a refracting system placed in front of the illuminant which consists of two half-lenses, either simple or composite, which are centered and superposed; the lower half-lens produces a virtual image of the illuminant, i. e. it affords a divergent beam, and the upper half-lens produces a real image, i. e. it affords a convergent beam.

The two half-lenses may be of the convergent type, and in this event they will have different focal distances or will be differently spaced apart, so that the illuminant will be situated between their respective focuses, but I may obviously employ a divergent lens for the lower half-lens.

The refracting combination whose principle has been above mentioned may be combined with a spherical, parabolic or like reflector, so disposed as to produce a real or virtual image of the illuminant, which image is situated in the same manner as the said source with reference to the object focuses of the refracting system.

In this event I may simplify the headlight, by eliminating one of the half-lenses of the refracting system, for instances, the half lens which affords a divergent beam if the illuminant is placed between the top of the reflector and its focus, i. e. if the reflector produces a virtual image; or on the contrary, the half-lens which affords a convergent beam, if the illuminant is placed beyond the focus of the reflector, which now gives a real image. In this device, it is obvious that the reflector replaces the half-lens which has been eliminated.

The following description with reference to the appended drawings shows the method in which the invention may be carried into effect.

Figures 1 and 2 are respectively diagrammatic views of two embodiments of the invention.

Figure 3 is analogous to Figure 1, but represents a concave reflector placed at the rear of the illuminant and sending its rays into the refracting system.

In Figure 1, L and $L^1$ indicate two superposed convergent half-lenses which are suitably spaced, whereof the focus is in each case F and $F^1$. S is the illuminant which is placed between the focuses F and $F^1$. The lens L forms virtual image $S'$ of the illuminant S, so that the beam from L will be divergent and will be situated entirely below the common optical axis of the set of lenses, as shown on the drawings. The lens $L^1$ produces a real image of S at $S'^1$, and the beam from this lens is convergent and is situated beyond the point $S'^1$ below the optical axis. The upper ray of the entire beam which is refracted will thus coincide with the optical axis of the headlight, or very nearly, and will hence be low enough to avoid blinding the motor car drivers coming in the opposite direction. Since the entire beam is sent downwardly, the whole of the light of the headlight will be concentrated on the surface of the road, and this will be much better lighted.

The illuminant may consist of an incandescent lamp, and this will be rectilinear and placed across the plane of the drawings in order to maintain the preceding conditions.

In the device shown in Figure 2, the convergent half-lens L has been replaced by a divergent half-lens $L^2$, and herein the lenses $L^1$ and $L^2$ may have the same focal distance; the illuminant S is beyond the two focuses which in the case of the figure are made to coincide at F, but these may be distinct. As before, the converging lens $L^1$ gives a real image $S'^1$; the diverging lens $L^2$ gives a virtual image $S^2$. The beam which is refracted has a path analogous to the one shown in Figure 1.

In the diagram shown in Figure 3, the upper system consists of two combined half-lenses $L^3$ providing for a greater convergence, and there is also added a concave reflector R which gives a virtual image of the illuminant S at $S''$ which, like S, is situated between F and F³, which are the foci of L and L³, respectively. The reflector may also be so disposed that the illuminant is situated at its geometric centre, and herein the image of the illuminant produced by the reflector will coincide with the illuminant itself.

Fig. 3 shows an apparatus for substantially carrying into effect the scheme of schematic Fig. 1, the apparatus of Fig. 3 also utilizing those rays rearwardly directed from the light source. The upper-half of the reflector shown therein directs rays incident thereon toward the lens system L³, which in turn converges those rays and directs them downwardly on the road. The lower-half of the reflector directs its incident rays towards the lower half-lens L, which in turn directs those rays below the horizontal on to the road.

In the case in which a reflector is combined with the aforesaid refracting system, the headlight may be simplified by eliminating either the half-lens producing the divergent beam, or the half-lens producing the convergent beam, according to the position of the illuminant with reference to the focus of the reflector.

Obviously, the said apparatus is susceptible of various modifications in detail without departing from the spirit of the invention.

I may further vary at will the convergent or divergent action of the two optical systems employed, as well as the position of the illuminant with reference to these two systems, provided of course, that a virtual image is produced by the lower optical system and a real image for the upper optical system.

What I claim is:—

1. In a headlight, a convergent half lens bounded by the horizontal plane of symmetry of the headlight and located above said plane, a source of light on the axis of the headlight behind said lens and at a distance therefrom greater than the focal length thereof, a half lens bounded by the same horizontal plane and disposed below it and rearwardly in relation to the upper half lens, said lower half lens being adapted to give a virtual image of said source of light on the axis of the headlight, whereby the light-rays from the source passing through the upper half lens form a convergent beam and those passing through the lower half lens form a divergent beam, both beams being upwardly bounded by the horizontal plane of symmetry of the headlight, and a reflector disposed behind the source of light and adapted to give an image of said source positioned between the foci of the two-half lenses whereby two other light-beams, one convergent passing through the upper half lens, and the other divergent passing through the lower half-lens, are produced.

2. In a headlight, a convergent half lens bounded by the horizontal plane of symmetry of the headlight and located above said plane, a source of light on the axis of the headlight behind said lens and at a distance therefrom greater than the focal length thereof, a convergent half lens displaced rearwardly in relation to the upper half-lens and in front of said source at a distance therefrom smaller than its focal length, said last mentioned half lens being bounded by the same horizontal plane and disposed below it, whereby the light-rays from the source passing through the upper half lens form a convergent beam and those passing through the lower half lens form a divergent beam, both beams being upwardly bounded by the horizontal plane of symmetry of the headlight, and a reflector disposed behind the source of light and adapted to give an image of said source that is positioned between the focuses of the two half lenses, whereby the light-rays reflected from the reflector produce, by passing through the half lenses, two beams similar to those produced by the light rays coming directly from the source.

3. In a headlight, a convergent light refracting device bounded by the horizontal plane of symmetry of the headlight and located above said plane, a source of light on the axis of the headlight behind said light refracting device and at a distance therefrom greater than the focal length thereof, a light refracting device in front of said source, bounded by the same horizontal plane and disposed below it, the last mentioned light refracting device being adapted to give a virtual image of said source of light on the axis of the headlight, whereby the light rays from the source passing through the upper light refracting device form a convergent beam and those passing through the lower refracting device form a divergent beam, both beams being upwardly bounded by the horizontal plane of symmetry of the headlight, and a reflector disposed behind the source of light and adapted to give an image of said source that is similarly positioned with respect to both light refracting devices as the source of light itself, whereby two other light beams, one convergent passing through the upper half lens, and the other divergent passing through the lower half lens are produced.

4. In a headlight, a convergent half lens bounded by the horizontal plane of symmetry of the headlight and located above said plane, a source of light on the axis of the headlight behind said lens and at a distance therefrom greater than the focal length thereof, a convergent half lens in front of said source at a distance thereof smaller than its focal length, said last mentioned half lens being bounded by the same horizontal plane and disposed below it, whereby the light rays from the source passing through the upper half lens form a convergent beam and those passing through the lower half lens form a divergent beam, both beams being upwardly bounded by the horizontal plane of symmetry of the headlight, and a reflector disposed behind the source of light and adapted to give an image of said source that is positioned between the focuses of the two half lenses, whereby the light rays reflected from the reflector produce, by passing through the half lenses, two beams similar to those produced by the light rays coming directly from the source.

In testimony whereof I have signed this specification.

AUGUSTE BENOIT FELIX PRUDHOMME.